(12) United States Patent
Pidgeon et al.

(10) Patent No.: US 12,276,513 B2
(45) Date of Patent: Apr. 15, 2025

(54) METHOD AND SYSTEM FOR POSITIONING WITH IMPROVED RESOURCE CONSERVATION

(71) Applicant: TDK Corporation, Tokyo (JP)

(72) Inventors: Curtis James Pidgeon, Calgary (CA); Juan Carlos Terrazas Borbon, Calgary (CA); Zainab Fatima Syed, Calgary (CA); Kyle Ken Loung Chau, Calgary (CA)

(*) Notice: Subject to any disclaimer, the term of this patent is extended or adjusted under 35 U.S.C. 154(b) by 48 days.

(21) Appl. No.: 17/735,355

(22) Filed: May 3, 2022

(65) Prior Publication Data

US 2022/0381572 A1  Dec. 1, 2022

Related U.S. Application Data

(60) Provisional application No. 63/193,881, filed on May 27, 2021.

(51) Int. Cl.
| | | |
|---|---|---|
| G01C 21/34 | (2006.01) | |
| G01C 21/32 | (2006.01) | |
| G06F 1/32 | (2019.01) | |
| G06F 1/3206 | (2019.01) | |
| G06F 1/3287 | (2019.01) | |

(52) U.S. Cl.
CPC ....... G01C 21/3469 (2013.01); G06F 1/3206 (2013.01); G06F 1/3287 (2013.01)

(58) Field of Classification Search
CPC .. G01C 21/3469; G06F 1/3206; G06F 1/3287
See application file for complete search history.

(56) References Cited

U.S. PATENT DOCUMENTS

| | | | |
|---|---|---|---|
| 10,994,630 B2* | 5/2021 | Han | B60L 53/65 |
| 2007/0149184 A1* | 6/2007 | Viegers | G08G 1/20 |
| | | | 701/519 |
| 2014/0180557 A1* | 6/2014 | Hunt | B60W 40/076 |
| | | | 701/99 |
| 2016/0061611 A1* | 3/2016 | Meyer | G01C 21/3469 |
| | | | 701/1 |
| 2018/0101998 A1* | 4/2018 | Pierce | G06F 16/24565 |
| 2019/0002047 A1* | 1/2019 | Ølmheim | G08G 1/205 |
| 2019/0061550 A1* | 2/2019 | Han | B60W 20/13 |
| 2019/0381891 A1* | 12/2019 | Moghe | G06N 20/00 |
| 2020/0337162 A1* | 10/2020 | Perkins | G04G 17/04 |
| 2020/0393259 A1* | 12/2020 | Gantt, Jr. | B60L 53/65 |
| 2021/0389144 A1* | 12/2021 | Kim | G01C 21/3691 |

* cited by examiner

Primary Examiner — Long T Tran

(57) ABSTRACT

A navigation solution for a vehicle is provided by obtaining motion sensor data from a sensor assembly of the vehicle, detecting a static condition for the vehicle based at least in part on the motion sensor data, selectively enabling reduced power operation and providing the navigation solution for the vehicle while reduced power operation is enabled. While reduced power operation is enabled, motion may be detected so that reduced power operation is disabled and a subsequent navigation solution is provided for the vehicle while reduced power operation is disabled.

20 Claims, 5 Drawing Sheets

METHOD AND SYSTEM FOR POSITIONING WITH IMPROVED RESOURCE CONSERVATION

CROSS-REFERENCE TO RELATED APPLICATIONS

This application claims priority to U.S. Provisional Patent Application No. 63/193,881, filed May 27,2021, the content of which is incorporated by reference in its entirety.

FIELD OF THE PRESENT DISCLOSURE

This disclosure generally relates to controlling positioning systems incorporated with navigable devices, particularly with regard to reducing power and other resource expenditure based on experienced motion conditions.

BACKGROUND

The development of microelectromechanical systems (MEMS) has enabled the incorporation of a wide variety of sensors in a variety of applications. Notably, information from motion sensors such as gyroscopes that measure angular velocity and accelerometers that measure specific forces along one or more orthogonal axes may be used to determine the orientation, change in relative orientation and/or translational displacement of a device incorporating the sensors for use to determine positional or navigational information for the device or for other suitable purposes. Common examples include vehicles and other devices for which determining a navigation solution that may include information about position, velocity and/or orientation is integral to proper function of the device. In many situations, information from Global Navigation Satellite Systems (GNSS) receivers provide a primary source of positioning but there remains a need for supplementing GNSS information with information from the motion sensors noted above, such as to improve performance of the GNSS positioning and/or to bridge periods of time during which GNSS information is degraded or denied. Accordingly, techniques involving an Inertial Navigation System (INS) using the noted low-cost MEMS sensors may be used, which may be implemented using an Inertial Measurement Unit (IMU). Dead Reckoning (DR) is an example of an indoor/outdoor positioning technique that accumulates successive displacement from a known starting point to derive the position. This displacement can be estimated with various algorithms within a certain accuracy using the inertial sensor measurements.

Accordingly, it would be desirable to provide navigation techniques employing such motion sensors. Further, it would be desirable to obtain such information even in the absence of other navigation strategies, such as when GNSS or other absolute position information is unavailable. It would also be desirable to achieve these goals using techniques that reduce computational demands and require fewer processing resources, allowing them to be implemented in cost and power efficient manners. As will be described in the following materials, this disclosure satisfies these and other needs.

SUMMARY

As will be described in detail below, this disclosure includes a method for providing a navigation solution for a vehicle. Motion sensor data is obtained from a sensor assembly of the vehicle, a static condition is detected for the vehicle based at least in part on the motion sensor data, reduced power operation is selectively enabled and the navigation solution for the vehicle is provided while reduced power operation is enabled.

This disclosure also includes a vehicle having a motion sensor assembly configured to provide motion sensor data for deriving navigation solutions for the vehicle and a controller having at least one processor. The at least one processor is configured to detect a static condition for the vehicle based at least in part on the motion sensor data, selectively enable reduced power operation and provide the navigation solution for the vehicle while reduced power operation is enabled.

This disclosure also includes a sensor processor unit having a motion sensor assembly configured to provide motion sensor data for deriving navigation solutions for a vehicle and a controller having at least one processor. The at least one processor is configured to detect a static condition for the vehicle based at least in part on the motion sensor data, selectively enable reduced power operation and provide the navigation solution for the vehicle while reduced power operation is enabled.

DETAILED DESCRIPTION

Figure 1:
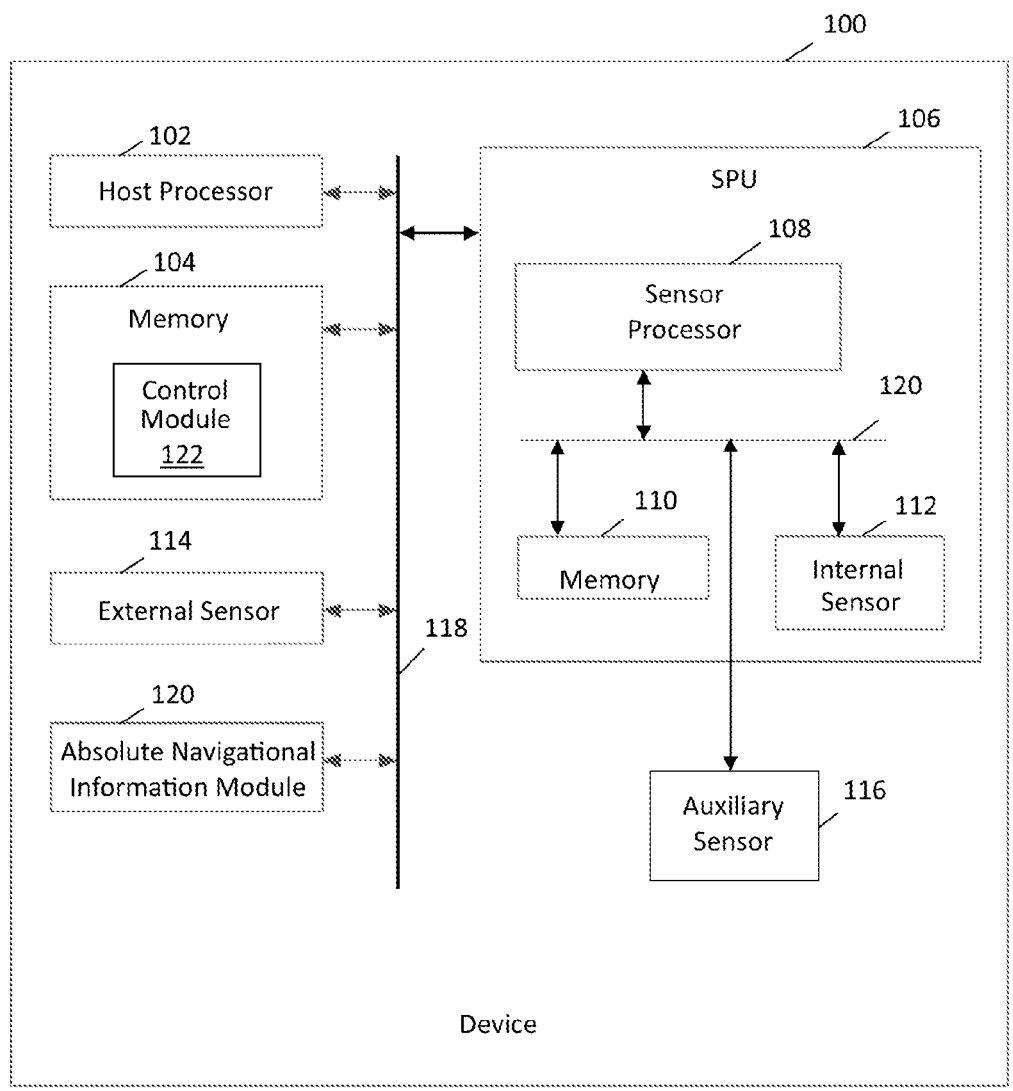
FIG. 1 is schematic diagram of device having a sensor assembly configured to employ a reduced power navigation algorithm according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more sensor processing units (SPUs), motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU and a microprocessor, a plurality of microprocessors, one or more microprocessors in conjunction with an SPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

It will be appreciated that positioning strategies employing motion sensors typically involve the use of state estimation processes such as a Kalman Filter (KF) or other navigation filters, but their usage is computationally heavy and requires resources including the CPU, RAM, ROM of the system to run. This strain causes power drain on the battery and reduces the overall system resource usage available to other tasks and subsystems. Similarly, large matrices are used in the predictive models to estimate things quantities for a navigation solution, such as position, attitude, velocity, IMU biases, IMU scale factors, etc. Notably, predictive models may require large matrices (e.g. 15×15 or larger) that are then multiplied, inverted, and transposed within the main processing loop, representing an extensive use of resources. Conventional approaches seek to reduce the resource usage on systems running a navigation filter through reducing the computational complexity of the mathematical models used in the filter model.

In a further aspect, many systems utilizing a navigation filter benefit from having constant positioning information which must be balanced against the requisite resource consumption to provide that capability continually. For example, the usage of other systems to running in conjunction or in the background require usage of processing and electrical power for the CPU to run at higher speeds when running the full solution. One attempt to reduce resource consumption is to allow for shutdown and storage of a priori information for faster start-ups (warm/hot starts). Nevertheless, this still requires the Kalman filter to re-converge at start-up/stabilize or for large amounts of information to be moved from RAM to ROM. Correspondingly, continually tracking navigation solutions or providing navigation solutions on demand require time, strain the system, and/or are not possible with the hardware configuration and limitations (such as when limited ROM is available). As an illustration, many embedded solutions typically run on low cost, low resource systems so the resource consumption associated with continual determination of navigation solutions for the device is not always possible.

These concerns are particularly notable in the field of micro-mobility, which typically connotes personal transportation using vehicles for distances that are greater than may be conveniently traversed on foot and is colloquially known as "the last mile navigation problem"). Correspondingly, there is a need for lightweight vehicles such as bicycles or scooters, especially electric ones, that may be used in these circumstances. Such vehicles represent a potential solution that provide movement over short distances faster, more efficiently and in an environmentally friendly manner.

Although users may own the respective micro-mobility platform, a more common usage involves renting or leasing systems from a third party that must be stored outside in designated locations such as rental kiosks. While such platforms give users a fast and efficient means of locating, renting, navigating, and returning the vehicles close to their end destination, mechanisms must exist for returning the vehicles to designated zones to be parked in an orderly fashion by providing a navigation solution for the vehicle so that its position and heading can be approved. As noted above, GNSS may be used for position and information from magnetometers may provide heading but these solutions are susceptible to multipath and the accuracy of magnetometers can be affected by magnetic anomalies in the area. To account for these deficiencies, information from an IMU may be used to supplement or provide a navigation solution independently, which necessitates the use of computation resources to run a navigation filter. This can mitigate the multipath and magnetic anomalies, but requires time to converge.

Despite the advantages of micro-mobility vehicles, they present specific problems when providing navigation solutions. One critical constraint is that the micro-mobility vehicle does not produce enough electricity to keep the battery charged through normal use and must therefore be recharged directly or its battery must be exchanged to be charged externally. Consequently, this reduces the usability of the vehicle as when the battery is low it must either be replaced with a charged one or it must be plugged in and sufficient time allowed for the battery to charge, necessitating undesirable delay for the user or the need to independently monitor the vehicles so that the batteries are replaced/recharged when needed. Providing charging stations that allow end users to recharge batteries only partially addresses the problems as they represent a need for infrastructure investment as well as potential exposure to battery theft. Such strategies also inconvenience paying customers if replacement or recharging the battery before use is required. Similarly, if the available batteries are not fully charged it may also limit where the user/renter can take the system before the battery dies. Renting the platforms to end users can also open up liability if the user is misusing the vehicle. For example, illustrations of possible misuse include drunk or sporadic driving, which can lead to injury, damage of property and/or the vehicle, mistreatment of the vehicle, such as dropping it to the ground instead of parking on the kick stand, picking up and/or throwing/dropping, and theft, since the platforms are lighter than motorbikes and cars they are easier to pick up, move and steal.

Particularly with such smaller vehicles, conventional strategies of storing a priori information for faster start up is not always possible or beneficial. Due to their inherent size, individual transportation vehicles like scooters and bicycles can be picked up and moved when powered down which correspondingly means that usage of any stored a priori navigation solution information can lead to worse start-up performance than a cold start with no a priori information. Notably, the possibility that a light-weight vehicle has been moved when powered off limits the ability to enable hot start functionality. Since hot starts use stored information from the end of the previous session (e.g., position and heading) for a faster initialization on the next run, a deviation from that stored information when the powered down vehicle is moved, that information is at best useless and more often causes the initial navigation solution using a priori information to be worse than what would be provided in the absence of that information. Providing a reliable hot start navigation solution is also desirable when a user renting a micro-mobility vehicle changes their mind and seeks to return the vehicle immediately. Without a rapid hot start navigation solution, there will be a delay while waiting for the navigation solution to converge with sufficient reliability to verify the vehicle's return which leads to customer dissatisfaction. As an illustration, an inaccurate hot start navigation solution might allow the user to improperly complete a check in procedure for the vehicle when it has not in fact been correctly parked, disrupting the management of the rental fleet and, depending on the terms of the rental agreement, exposing the user to excess charges.

For the sake of comparison, the power drain associated with providing navigation solutions in vehicles like motorcycles, four wheeled passenger automobiles or larger conveyances is typically not as problematic as these vehicle can employ greater battery reserves that have substantially longer endurance and/or are capable of charging themselves (e.g., a vehicle having an internal combustion engine to drive an alternator), allowing the navigation system to be connected and provide uninterrupted determination of navigation solutions for the vehicle. Thus, if the systems providing the navigation solution are not connected to a battery of adequate reserve, similar challenges may exist, such as the need to rely on an auxiliary source of power that may suffer from the limitations discussed above when providing continuous navigation solutions, with the understanding that larger vehicles may not be subject to significant movement when unpowered. Nevertheless, it will be appreciated that power management is an important aspect of any electrical system and reducing the power required where possible is beneficial to the platform owner, renter, and end user. Accordingly, the techniques of this disclosure are direct to providing active switching of batteries required to power the Microprocessor Unit (MPU), the Microcontroller Unit (MCU), motor, as well as other sub systems in order to achieve greater efficiency both for systems in the micromobility market as well as more conventional vehicles.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly, as shown here in the form of integrated sensor processing unit (SPU) 106 featuring sensor processor 108, memory 110 and internal sensor arrangement 112. Depending on the embodiment, multiple SPUs could also be used for example. Memory 110 may store algorithms, routines or other instructions for processing data output by internal sensor arrangement 112 and/or other sensors as described below using logic or controllers of sensor processor 108, as well as storing raw data and/or motion data output by internal sensor configuration 112 or other sensors. Memory 110 may also be used for any of the functions associated with memory 104. Internal sensor arrangement 112 may be one or more sensors, such as for measuring motion, position, and/or orientation of device 100 in space, such as an accelerometer, a gyroscope, a magnetometer, a pressure sensor or others. For example, SPU 106 measures one or more axes of rotation and/or one or more axes of acceleration of the device.

In one embodiment, internal sensor arrangement 112 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. Sensors of the same type measure equivalent aspects of motion or environmental phenomena, with the same sensitive axes or the same combination of sensitive axes. In one aspect, multiple three-axis gyroscopes and/or multiple three-axis accelerometers may be employed, such that a sensor fusion operation performed by sensor processor 108, or other processing resources of device 100, combines data from the active sensors of internal sensor arrangement 112 to provide a six axis determination of motion or six degrees of freedom (6DOF). Equally, the techniques may be applied in more granularly by providing a plurality of same type single-axis sensors for different numbers of axes as desired. As desired, internal sensor arrangement 112 may be implemented using Micro Electro Mechanical System (MEMS) to be integrated with SPU 106 in a single package. Exemplary details regarding suitable configurations of host processor 102 and SPU 106 may be found in, commonly owned U.S. Pat. No. 8,250,921, issued Aug. 28, 2012, and U.S. Pat. No. 8,952,832, issued Feb. 10, 2015, which are hereby incorporated by reference in their entirety. Suitable implementations for SPU 106 in device 100 are available from TDK InvenSense, Inc. of San Jose, Calif.

Alternatively, or in addition, device 100 may implement a sensor assembly in the form of external sensor arrangement 114, representing one or more sensors as described above, such as an accelerometer and/or a gyroscope. As used herein, "external" means a sensor that is not integrated with SPU 106 and may be remote or local to device 100. Also alternatively or in addition, SPU 106 may receive data from an auxiliary sensor arrangement 116 configured to measure one or more aspects about the environment surrounding device 100, and which may also implement motion sensors or may feature other sensors. For example, a pressure sensor and/or a magnetometer may be used to refine motion determinations made using internal sensor arrangement 112. In one embodiment, auxiliary sensor arrangement 116 may include a magnetometer measuring along three orthogonal axes and output data to be fused with the gyroscope and accelerometer inertial sensor data to provide a nine axis determination of motion. In another embodiment, auxiliary sensor arrangement 116 may also include a pressure sensor to provide an altitude determination that may be fused with the other sensor data to provide a ten axis determination of motion. Although described in the context of one or more sensors being MEMS based, the techniques of this disclosure may be applied to any sensor design or implementation. For example, one of external sensor arrangement 114 and/or auxiliary sensor arrangement 116 may include a speed or other odometry sensor such as from a wheel encoder.

In the embodiment shown, host processor 102, memory 104, SPU 106 and other components of device 100 may be coupled through bus 118, while sensor processor 108, memory 110, internal sensor arrangement 112 and/or auxiliary sensor arrangement 116 may be coupled though bus 120, either of which may be any suitable bus or interface, such as a peripheral component interconnect express (PCIe)

bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

As opposed to sensor-based information, such as information that may be obtained from the self-contained sensors represented by internal sensor 112, external sensor 114 and/or auxiliary sensor 116 discussed above, device 100 may also include absolute navigational information module 120 that provides any desired degree of location awareness capabilities. In one aspect, this may include a reference-based wireless system providing a source of absolute location information for device 100. Representative technologies that may be embodied by absolute navigational information module 124 include: (i) global navigation satellite system (GNSS) receiver such as global positioning system (GPS), GLONASS, Galileo and Beidou, or any other GNSS, as well as (ii) WiFi™ positioning, (iii) cellular tower positioning, (iv) Bluetooth-based positioning; (v) Bluetooth low energy (BLE)-based positioning; (vi) other wireless-based positioning; and (vii) visual light communication-based positioning or other similar methods.

Any combination of sensor components of device 100 may be formed on different chips or may be integrated and reside on the same chip. Likewise, the sensor components can be otherwise enclosed or covered to create a unitary package. A chip may be defined to include at least one substrate typically formed from a semiconductor material. A single chip or package may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

Code, algorithms, routines or other instructions for processing sensor data may be employed by control module 124, schematically represented in this figure as being stored in memory 104 for execution by host processor 102, to perform any of the operations associated with the techniques of this disclosure. Alternatively, or in addition, the functionality of control module 124 may be implemented using sensor processor 108 and memory 110 or with any other distribution of processing resources available to device 100. Control module 124 implements a reduced power navigation algorithm to address the issues noted concerning resource conservation while maintaining sufficient accuracy for applications including micro-mobility vehicles. Notably, the reduced power navigation algorithm exploits detection of static periods in which motion of device 100 is below a suitable threshold such as by monitoring the outputs of internal sensor arrangement 112, external sensor 114 arrangement and/or auxiliary sensor arrangement 116. During a static period, the system states required for accurate positioning remain largely constant and by detecting such static periods, processing load and power consumption can be reduced by fully or partially disabling the state estimation process used to provide navigation solutions for device 100, such as a Kalman Filter (KF).

In a first embodiment, the reduced power navigation algorithm causes the state estimation to continue running in a partially disabled state during detected static periods. Although inertial motion sensor inputs, such as from internal sensor arrangement 112, external sensor arrangement 114 and/or auxiliary sensor arrangement 116 are still obtained, their sample rate may be reduced to conserve power and processing resources. Alternatively or in addition, other inputs such as absolute navigational information module 120, odometry information or others may be disabled or duty cycled to reduce power consumption. Correspondingly, the lower processor usage can provide power savings or allow processing load to be shifted to other tasks. In a second embodiment, SPU 106 provides Wake on Motion (WoM) functionality. As will be appreciated, WoM provides an interrupt when an inertial motion sensor, such as an accelerometer, outputs a change exceeding a suitable threshold and is becoming more commonly available in IMUs. With WoM available, host processor 102 can be turned off during static periods, depending on the system architecture, allowing the lower powered sensor processor 108 to detect motion and perform any other necessary routines. In this embodiment, inputs to the state estimation are halted, leaving it in a suspended state. When the WoM interrupt is issued, host processor 102 turns back on and inputs to the state estimation are resumed. In a third embodiment, a combination of the above features are implemented with control module 124 partially disabling state estimation by reducing the inputs and then transitioning to fully disabling state estimation provided WoM is available. The more accurate the static and motion detection are using the reduced power navigation algorithm or WoM, the greater accuracy can be provided by the state estimation process, which corresponds to how quickly the core state estimation processing resumes.

Regardless of which embodiment is employed, the reduced power navigation algorithm may be configured to provide sufficient power to allow hot start parameters to be stored in RAM. Desirably, this reduces the number of times ROM must be employed to store the parameters. Although ROM can store information without being powered on, the number of times ROM can be written to is typically limited.

Further, all embodiments benefit by allowing all processing not required for static/motion detection to be disabled (if not required for other subsystems) and quickly resumed once motion continues when reduced power operation is enabled. Particularly, fully disabling state estimation removes computationally heavy algorithms that increase usage load and power drain. When WoM functionality is available and used to suspend operation of host processor 102, for example, it may be desirable to periodically wake the processor even if motion is not detected to update the IMU biases during the detected static period. As an illustration only, a suitable interval may be approximately 30-60 minutes depending on accuracy requirements. Periodic awakening can improve navigation estimation performance once the system goes back into motion and tracking resumes by compensating for the IMU biases that drift with time and temperature and keeping the bias estimate accurate and up to date will improve state estimation when reenabled.

Accordingly, the reduced power navigation algorithm techniques of this disclosure enable a continuous navigation solution for device 100, such as by providing position and orientation (heading), while reducing system resource usage during detected static periods as compared to the full navigation solution functionality provided during motion of device 100. As will be appreciated, these techniques represent a number of significant benefits. For example, in the context of micro-mobility vehicles, the reduced power navigation algorithm allows for accurate hot starts by excluding the possibility that the device has been moved or displaced when not in use. In turn, accurate hot starts also allow the micro-mobility vehicle to be returned immediately with verified parking if the user's mind changes without requiring a delay for the navigation solution to converge. Similarly, continually providing a navigation solution by performing state estimation during motion and ensuring position or orientation remain unchanged during detected static periods allows the micro-mobility vehicle to be accurately tracked at all times without incurring the resource consumption of running absolute navigation module 120 constantly. The conservation of resources can also be improved when WoM functionality is available. Still further, the reduced power navigation algorithm allows sensor biases and thresholds to be configured before the user initiates the rental which reduces startup errors caused by temperature or other drift factors. Yet another benefit is the ability to detect unauthorized movement of the micro-mobility vehicle to reduce the threat of theft without requiring state estimation to be fully enabled continually.

Figure 2:
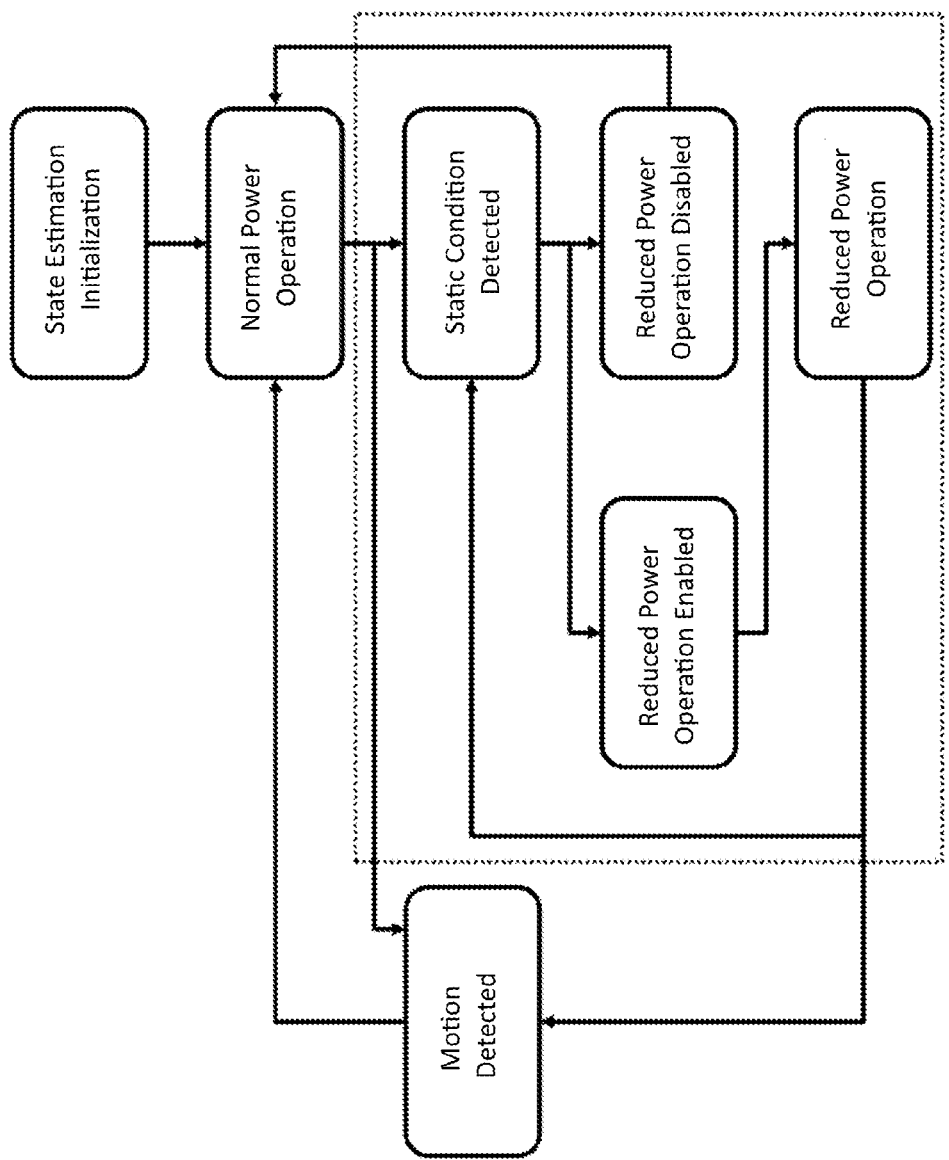
FIG. 2 is an exemplary flow diagram of a routine implementing a reduced power navigation algorithm according to an embodiment.

To help illustrate aspects of this disclosure, FIG. 2 is an exemplary flow diagram showing one possible implementation of the core features of the reduced power navigation algorithm. When the system is powered on and starts the state estimation process library, a state estimation initialization is performed as indicated. During this alignment phase, the IMU biases and static detection thresholds may be set and state estimation performed to provide initial position and orientation if not available from a previous session. Next, during normal power operation, state estimation is performed using the inputs from inertial motion sensors, other sensors and/or absolute navigational information. As shown, the flow branches depending on whether motion is detected or a static condition is detected using the navigation solutions provided by the state estimation. When motion is detected, the routine simply returns to the normal operation condition with navigation solutions provided by normal operation of state estimation. When a static condition is detected, the flow branches again depending on whether reduced power operation is enabled or disabled according to the logic loop indicated by the dotted outline. Enablement of reduced power operation may be dependent on configurable factors, such as how recently reduced power operation was previously enabled and/or length of the static condition, so that switching between states does not occur with undesirable frequency. For example, if reduced power operation was enabled relatively recently, a shorter static period may be sufficient to enable reduced power operation while if reduced power operation was not enabled relatively recently, a longer static period may be required before enabling reduced power operation. As shown, if reduced power operation is not enabled, the flow returns to normal power operation of state estimation. Conversely, if reduced power operation is enabled, the flow proceeds to the indicated reduced power operation condition in which state estimation is fully or partially disabled using inputs only from one or more inertial motion sensors. In one aspect, an accelerometer alone is employed as these sensors are typically more power efficient than gyroscopes. The reduced power operation is performed using only the inertial motion sensor input, with the flow branching either to the static condition detected or the motion detected states discussed above. Although not shown in this figure, the reduced power navigation algorithm may exit upon external input, such as a hardware shutdown. Suitable steps include halting inputs to the state estimation process, allowing the state estimation to be completed on the inputs from the previous epoch and saving hot start parameters to ROM.

In a further aspect, the reduced power navigation algorithm may optionally govern the reduced power operation status based also on the desirability of providing context detection. Specifically, the information available from internal sensor arrangement 112, external sensor arrangement 114 and/or auxiliary sensor arrangement 116, particularly the information from inertial motion sensors may be used to make determinations in addition to the navigation solutions. For example, the condition of device 100 may be assessed by analyzing the motion it is experiencing. For example, the inertial motion sensor data may be used to determine if a micro-mobility vehicle is in a proper, upright orientation or whether it is in an improper orientation, such as on its side or upside down due to a rollover. Clearly, this information facilitates the management of the micro-mobility vehicle fleet. Likewise, crashes, impacts or other similar events may also be determined by a context detection analysis of the inertial motion sensor data. Still further, unauthorized movement of device may also be determined through context detection to help deter theft. In addition to detecting unauthorized movement, the inertial motion sensor data can distinguish between the micro-mobility vehicle being carried by hand and being transported by vehicle. Notably, the reduced power navigation algorithm may be configured to disable the reduced power operation when context detection is desired so that state estimation is performed under a full power state to increase accuracy of the context detection. Context detection can also be disabled when reduced power operation is enabled and can easily be resumed after motion detection triggers a return to normal power operation. Consequently, theft or vandalism can be detected even when device 100 is not rented or is otherwise 'not in use', while during 'in use' intentional or unintentional damage by the user/renter may be tracked and/or erratic driving behavior and rough usage can be more easily be monitored.

Similar to motion detection when reduced power operation is enabled, accelerometer readings alone that exceed a suitable threshold may be used to return to normal power operation. With reduced power operation enabled, all sensors can be disabled except for the accelerometer. If desired, a separate context detection algorithm may be used to supplement the normal motion detection algorithms used during full state estimation. As a result, the normal motion detection may employ more lenient thresholds, such as to maintain the static condition detection of the reduced power navigation algorithm through small fidgeting motions, or may be fully disabled. Moreover, different motion detection methods may be employed depending on the different contexts being detected. Since some may be more resource intensive, selectively disabling them during reduced power operation can lead to additional efficiencies. For example, monitoring any change in potential context change motions with accelerometers only is simpler and less resource/power intensive. Further, employing context detection of motion also allows only the specific sensors required for the context detection algorithms being used to be enabled while disabling the others based on the types of motions detected. As desired, the context detection algorithms can be enabled without performing full state estimation or full state estimation may be enabled after any context motion change is detected if the context detection is used instead of the normal static/motion detection algorithm. Correspondingly, performing context detection in conjunction with the reduced power navigation algorithm allows sensors required for the context detection to remain off until required when reduced power operation is enabled. Further, complex algorithms used for context detection can be simplified to only use accelerometer signals for initial detection while reduced power operation is enabled and more complex static/motion detection modules can be disabled. As will be appreciated, all of the above techniques provide resource conservation and help reduce battery drain.

From the above discussion, the techniques of this disclosure may be seen to enable more accurate hot starts for micro-mobility platforms, such as by allowing usage of hot start parameters like position and orientation to be used between rider/renter usage instead of performing a lower accuracy cold start at the beginning of each session/Specifically, usage of these values is made possible because if the device is moved when reduced power operation is enabled, that motion is still detected and normal power operation reenabled to all state estimation to provide full navigation solutions, tracking position and orientation for example. Likewise, the reduced power navigation algorithm quickly reduces the computational complexity of state estimation, such as a navigation KF or other filter, to save battery power and reduce system resource usage of RAM, CPU, etc. on the system through linking filter processing to consecutive static detection and/or lack of motion as compared to always being in a normal power operation condition. Notably, all non-essential modules may be disabled when reduced power operation is enabled, using only static/motion detection modules or, when WoM functionality is available, the static/motion detection modules may also be disabled. Some hot start algorithms require large matrices and data that must otherwise be stored in ROM, but having reduced power operation enabled, these matrices can be kept in RAM which is designed for constant re-writes to preserve the limited numbers of write cycles available to the ROM and consequently extend device lifetime. Battery power and system resource usage are conserved by keeping extra sensors from running that are not required when in a static condition, with position and orientation unchanging. These strategies similarly benefit context determination, such as by allowing a preliminary determination of motion during reduced power operation before transitioning to more involved context determinations and full navigation solution state estimation under normal power operation.

From the above, it will be appreciated that the techniques of this disclosure include a method for providing a navigation solution for a vehicle. Motion sensor data is obtained from a sensor assembly of the vehicle, a static condition is detected for the vehicle based at least in part on the motion sensor data, reduced power operation is selectively enabled and the navigation solution for the vehicle is provided while reduced power operation is enabled.

In one aspect, providing the navigation solution for the vehicle while reduced power operation is enabled may include performing state estimation under at least one of reduced inputs and reduced computation complexity.

In one aspect, at least one of a source of absolute navigational information and a sensor of the vehicle may be disabled.

In one aspect, a sensor sampling rate may be reduced.

In one aspect, a hot start may be performed under normal power operation using the navigation solution provided for the vehicle while reduced power operation is enabled. Power for random access memory may be provided while reduced power operation is enabled and hot start parameters stored in the random access memory.

In one aspect, reduced power operation may be selectively enabled based on at least one of recency of a previous period of reduced power operation and a length of the static condition. Selectively enabling reduced power operation may be further based on a rental status of the vehicle.

In one aspect, motion may be detected while reduced power operation is enabled, so that reduced power operation may be disabled and a subsequent navigation solution for the vehicle may be provided while reduced power operation is disabled.

In one aspect, wake on motion functionality may be activated while reduced power operation is enabled and disabling a host processor. Activating the wake on motion functionality may include selectively activating the wake on motion functionality based at least in part on recency of a previous period of wake on motion functionality activation.

In one aspect, context detection may be performed for the vehicle while reduced power operation is enabled. Reduced power operation may be disabled based at least in part on the context detection. Context detection may be performed using only accelerometer data.

This disclosure also includes a vehicle having a motion sensor assembly configured to provide motion sensor data for deriving navigation solutions for the vehicle and a controller having at least one processor. The at least one processor is configured to detect a static condition for the vehicle based at least in part on the motion sensor data, selectively enable reduced power operation and provide the navigation solution for the vehicle while reduced power operation is enabled.

In one aspect, the controller may be further configured to detect motion while reduced power operation is enabled, disable reduced power operation and provide a subsequent navigation solution for the vehicle while reduced power operation is disabled.

In one aspect, the controller may be further configured to activate wake on motion functionality while reduced power operation is enabled and disable a host processor.

In one aspect, the controller may be further configured to perform context detection for the vehicle while reduced power operation is enabled. The controller may also be further configured to disable reduced power operation based at least in part on the context detection.

This disclosure also includes a sensor processor unit having a motion sensor assembly configured to provide motion sensor data for deriving navigation solutions for a vehicle and a controller having at least one processor. The at least one processor is configured to detect a static condition for the vehicle based at least in part on the motion sensor data, selectively enable reduced power operation and provide the navigation solution for the vehicle while reduced power operation is enabled.

EXAMPLES

The following materials include more detailed illustrations of particular embodiments of the techniques of this disclosure which serve to indicate possible implementations but should not be viewed as limiting.

Figure 3:
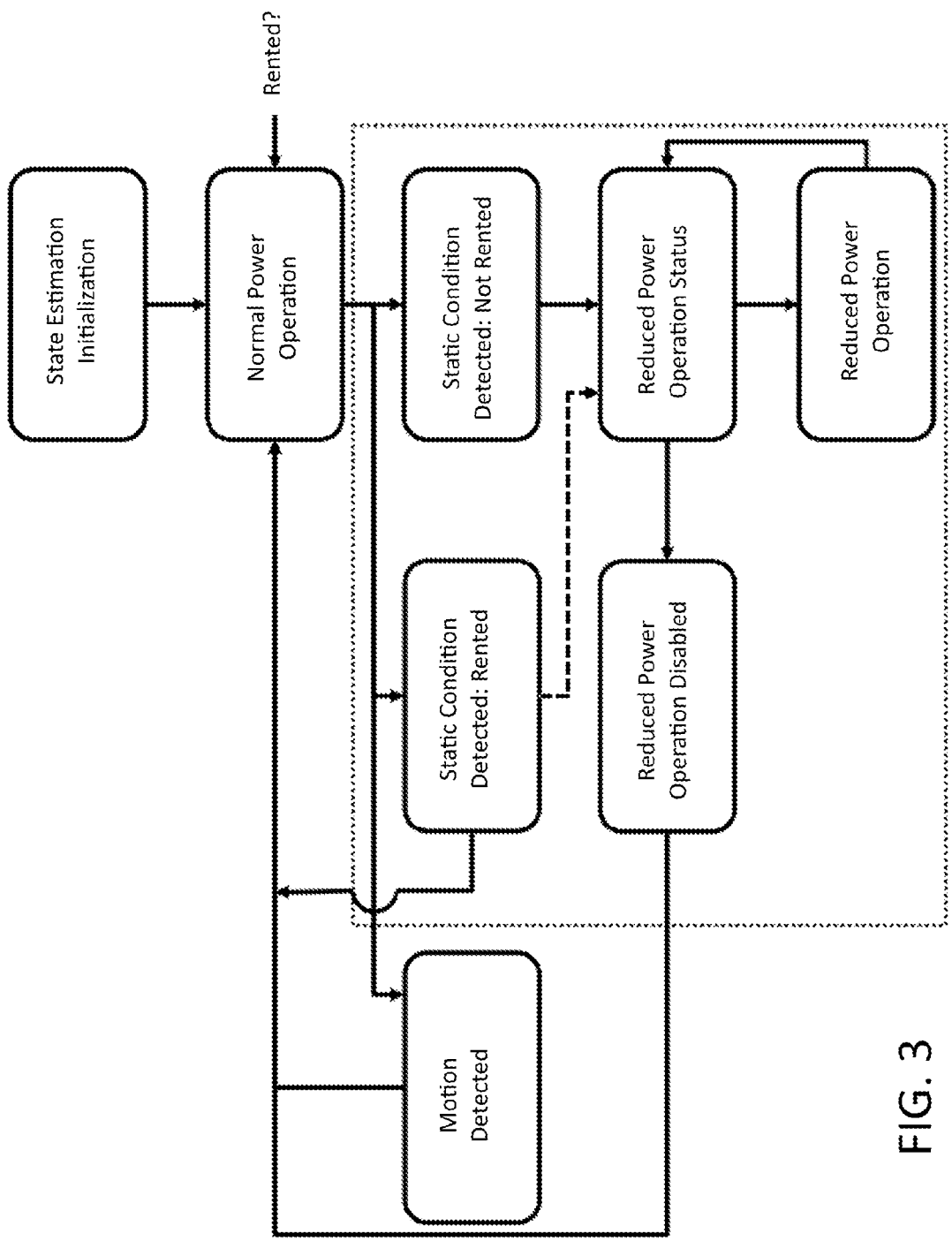
FIG. 3 is an exemplary flow diagram of a routine implementing a reduced power navigation algorithm without wake on motion functionality for a rentable vehicle according to an embodiment.

As noted above, the reduced power navigation algorithms of the present application do not require WoM functionality and may still provide benefits by reducing resource consumption while maintaining a sufficient degree of positional and movement awareness. Accordingly, the embodiment represented in the exemplary flow diagram of FIG. 3 is suitable for usage in situations where a user may rent a micro-mobility vehicle. As compared to the embodiment discussed with regard to FIG. 2, this implementation features two flow branches when a static condition exists depending on the rental status of the vehicle. Correspondingly, a similar step of state estimation initialization is performed as indicated when the system is powered on and starts the state estimation process library. Then, state estimation is performed using the inputs from inertial motion sensors, other sensors and/or absolute navigational information as discussed above during normal power operation. At this stage, the process also receives input regarding the rental status of the vehicle, namely whether the vehicle has been checked out by a user or whether the vehicle is checked in to a kiosk and is ready for rental. As with the embodiment of FIG. 2, if motion is detected during normal operation, the flow simply returns to normal operation of state estimation. However, if a static condition is detected, different operations may be performed depending on the rental status as illustrated in FIG. 3. When the vehicle is static and has not been rented, a reduced power operation enablement status determination similar to the logic loop shown in FIG. 2 is performed, which results in the flow returning to monitor the reduced power operation enablement status when reduced power operation is enabled and results in the flow returning to normal power operation of state estimation when the reduced power operation enablement status is disabled. As an illustration only and without limitation, reduced power operation may be enabled if:
  i) the reduced power operation had been enabled within the last 20 seconds and a static condition has been detected for at least 10 seconds; or
  ii) the reduced power operation has not been enabled within the last 20 seconds and a static condition has been detected for at least 180 seconds.

It should be appreciated these time periods are for illustration only and other periods may be employed depending on the desired characteristics. Conversely, when the static condition is detected and the vehicle is rented, a primary option is that the flow still returns to normal power operation of state estimation. As will be appreciated, this ensures that the most accuracy in determining navigation solutions for the vehicle is obtained throughout the rental period. However, as an alternative that may provide greater resource conservation at the expense of some reduction in accuracy, the dashed path shows that the flow could instead progress to the reduced power operation enablement status determination to allow entry to reduced power operation even when the vehicle is rented. Naturally, this may provide greater economy but there may be a degradation in the user experience. Notably, this routine represents a more complex logic loop, indicated by the dotted outline, which as discussed above selectively incorporates the reduced power operation enablement status determination from FIG. 2 depending on the rental status of the vehicle.

Figure 4:
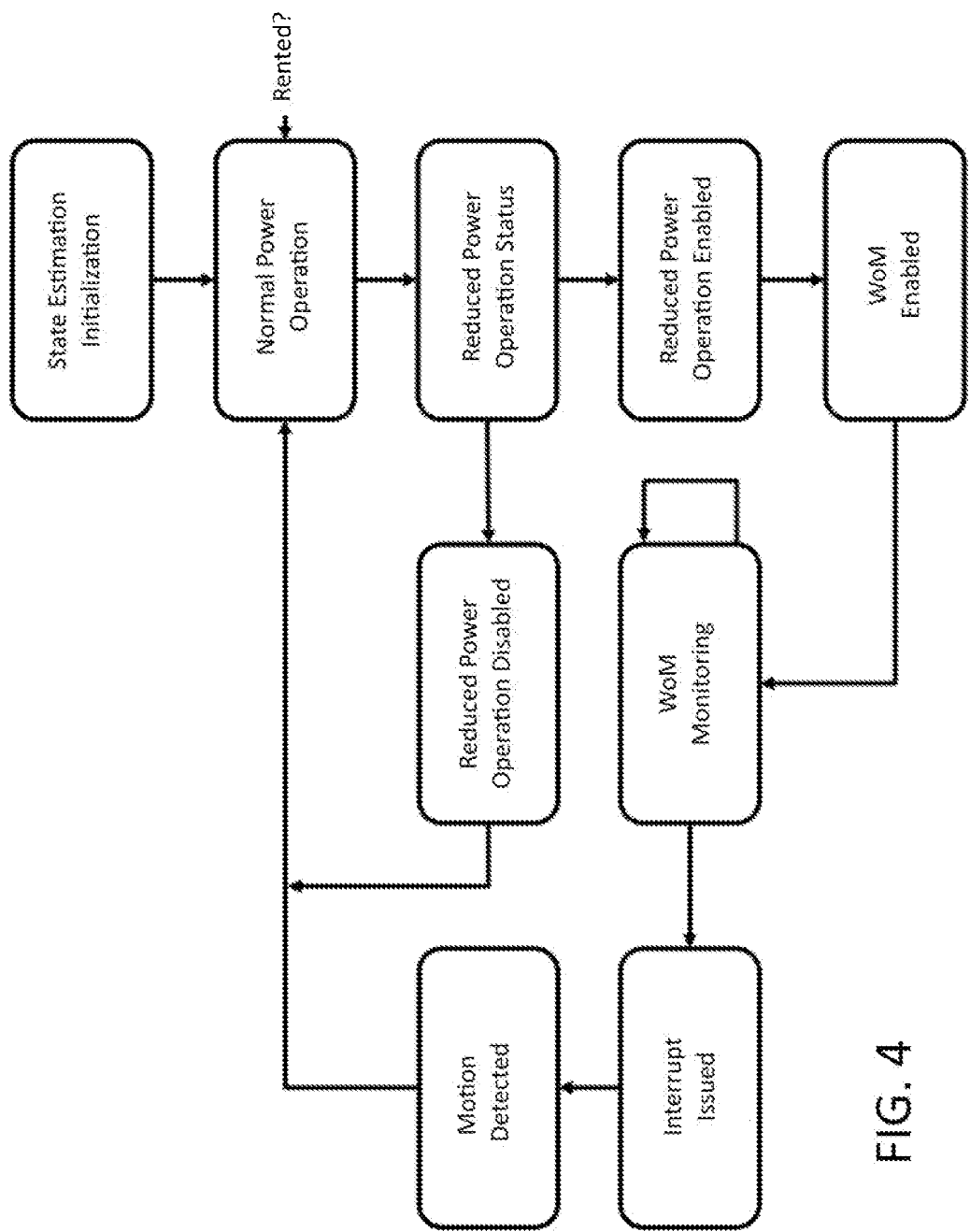
FIG. 4 is an exemplary flow diagram of a routine implementing a reduced power navigation algorithm with wake on motion functionality for a rentable vehicle according to an embodiment.

As an illustration of an embodiment that features usage of WoM functionality, FIG. 4 is another flow diagram suitable for usage in situations where a user may rent a micro-mobility vehicle. Once more, state estimation initialization is initially performed and then during normal power operation, state estimation is performed using the inputs from inertial motion sensors, other sensors and/or absolute navigational information as discussed above, while also receiving input regarding the rental status of the vehicle. For the sake of clarity, the flow when motion is detected during normal operation is not depicted, but the flow similarly returns to normal operation of state estimation. When a static condition is detected, the different operations according to the reduced power operation enablement status determination similar to the logic loop shown in FIG. 3, which also incorporates the logic loop of FIG. 2 as discussed above. Correspondingly, the flow to normal power operation of state estimation when the reduced power operation enablement status is disabled. To improve efficiency when WoM functionality is available, this routine includes the further path of enabling WoM operation in which host processor 102 or other application processors are powered down and motion monitoring is performed using a reduced set of sensors and processing resources, (e.g., accelerometers only by SPU 106.) As indicated, this leads to the state where WoM monitoring is maintained until sensor readings exceed a suitable threshold and the WoM modules issues an interrupt to indicate motion has been detected, at which point the routine flows as shown back to normal power operation of state estimation.

Figure 5:
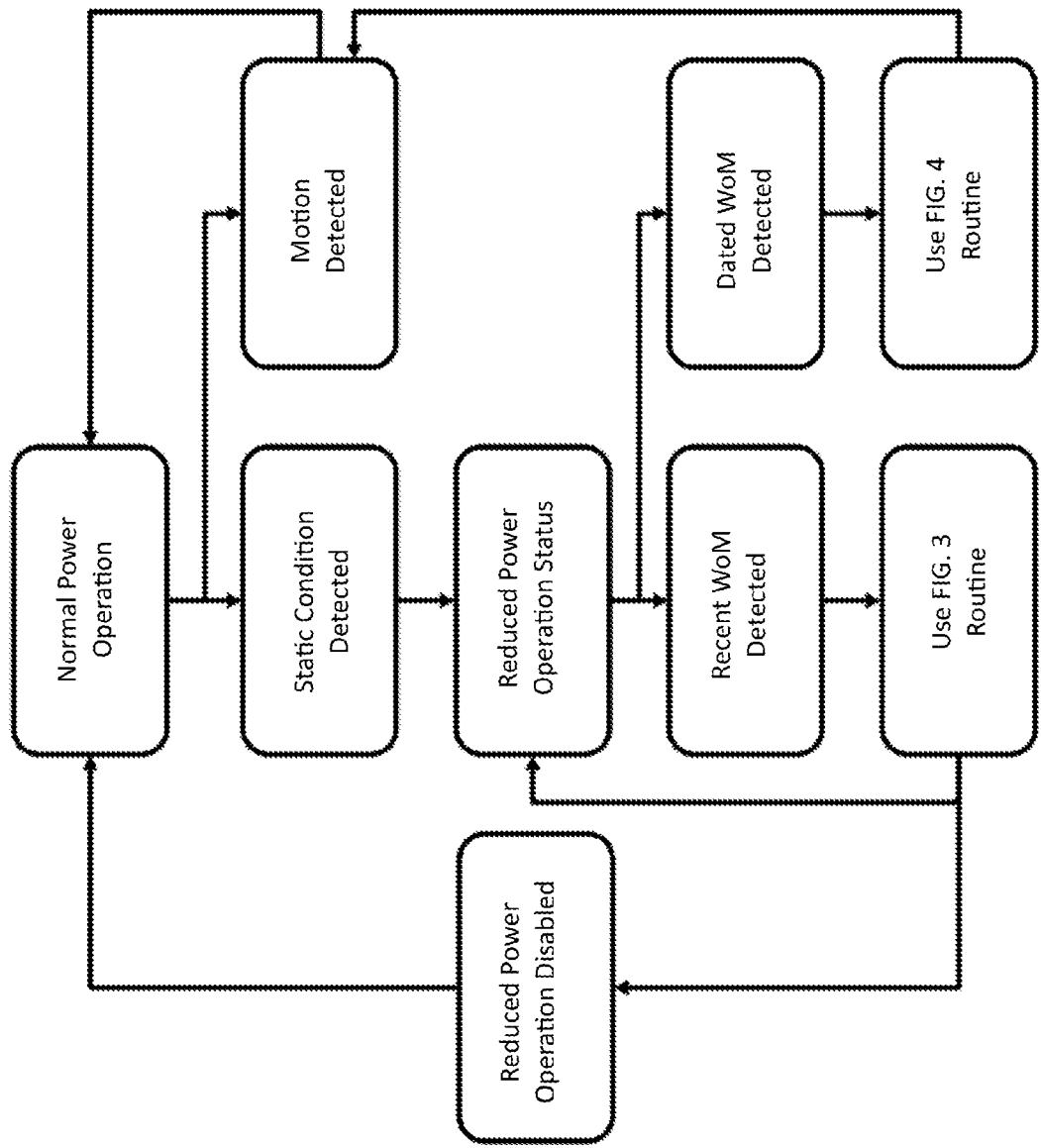
FIG. 5 is an exemplary flow diagram of a routine implementing a reduced power navigation algorithm that selectively provides wake on motion functionality vehicle according to an embodiment.

As yet a further illustration of suitable implementations, FIG. 5 illustrates a combination of the approaches represented by FIGS. 3 and 4. Although WoM offers an opportunity to achieve further efficiencies, there may also be some performance degradation. For example, there may be a delay (e.g., approximately 100 ms) after a gyroscope is enabled before accurate readings are produced depending on the hardware and this can lead to missed dynamics immediately after state estimation returns to normal power operation and may degrade the produced navigation solutions. Correspondingly, it may be undesirable to transition between enabling and disabling WoM operation too frequently. Therefore, limiting how frequently or under which conditions WoM operation is enabled may provide a better balance between resource conservation and navigation solution accuracy. In this embodiment, when motion is detected during normal power operation of state estimation, the flow maintains normal power operation similar to the above embodiments. Also, when a static condition is detected, a reduced power operation enablement status determination similar to FIG. 4 is performed. Here, however, rather than immediately enabling WoM operation, the flow branches depending on the WoM history. One branch is followed when WoM operation has been enabled relatively recently such that operations corresponding to FIG. 3 are performed and the other branch is followed when WoM operation has not been enabled recently such that operations corresponding to FIG. 4 are performed. As an illustration only and without limitation, a period of 180 seconds may be used to distinguish between recent and dated WoM operation although it should be appreciated that other duration may be employed depending on the desired performance and economy characteristics.

Since implementation of a reduced power navigation algorithm includes selectively enabling and disabling various sensor systems, the following discussion provide some possible examples of suitable operations but should be viewed as being for the sake of illustration and without limitation. For example, when a sufficient static condition has been detected to enable reduced power operation, one or more of the following sensor systems can be disabled or have the operation adjusted. Particularly, absolute navigational information source 120 can be turned off or operated in a low power mode depending on power saving and system accuracy requirements. Further, any inertial motion sensors from internal sensor arrangement 112, external sensor arrangement 114 and/or auxiliary sensor arrangement 116 may be run normally for optimal performance or for better efficiency, any combination may be performed of disabling down sampling and reducing the sampling rate to the processing rate (e.g., 100 Hz sample rate down to 20 Hz state estimation rate), disabling down sampling and performing a simple averaging (e.g., average every 5 samples), and/or disabling the gyroscope and performing static and motion detection using accelerometer signals only. For other sensors, including speed, barometer, magnetometer, Wi-Fi, vision, etc., any or all may be disabled for optimal battery savings or improved performance can be obtained by maintaining availability of the speed sensor. Moreover, when transitioning reduced power operation from being enabled to disabled, whether from normal detected motion or from a context determination, the various sensor systems may be reenabled at different rates. Inertial motion sensors generally should be returned to normal operation without delay. However, given that satellite acquisition can use significant battery and system resources, it may be desirable to wait for a period of sustained motion (e.g., 30 sec) before turning back on or disabling power saving mode for absolute navigational information source 120. Likewise, other sensors can be enabled immediately to optimize performance or a similar period of sustained motion can be required before reenabling one or more of these other sensors.

As discussed above, another aspect of the reduced power navigation algorithm techniques of this disclosure can include triggering a return to normal power operation for context determination when reduced power operation is enabled based on analysis of inertial motion sensor information, particularly a reduced set of input such as accelerometer data alone. In one embodiment, this may include determining roll, pitch, and heading misalignments. As known to one of ordinary skill in the art, misalignments are the angles between the x, y, z axes of the sensors and the x, y, z axes defined in relation to the vehicle. By correcting the accelerometer readings by the misalignments, the accelerations measurements are now in the same coordinate frame as the vehicle. In the following illustrative embodiment, the accelerometer signals are taken as already having been corrected by the predicted biases, scale factors, and other error sources obtained from the state estimation technique being employed. Also, for the sake of illustration only, the state estimation operating frequency is 20 Hz and the example thresholds are provided according to this example, but can be increased or decreased based on desired performance characteristics, including the degree of sensitivity or reactivity.

First, suitable operations that may be employed to perform a levelling procedure include estimating roll according to Equation (1) and pitch according to Equation (2) for accelerometer data:

$$r = \text{roll} = \text{atan2}\left(\frac{-accel_y}{-accel_z}\right) \quad (1)$$

$$p = \text{pitch} = \text{atan2}\left(\frac{accel_x}{\sqrt{accel_y^2 + accel_z^2}}\right) \quad (2)$$

Next, the accelerometer roll and pitch may be averaged over a suitable period (e.g., 1 sec) according to Equation (3) and Equation (4):

$$r_{avg} = \frac{\sum_{i=0}^{x} r_i}{x} \quad (3)$$

$$p_{avg} = \frac{\sum_{i=0}^{x} p_i}{x} \quad (4)$$

A direction cosine matrix may be generated to rotate into the level frame, where $$e = \text{euler angle} = \begin{bmatrix} r_{avg} \\ p_{avg} \\ 0 \end{bmatrix} \quad \begin{matrix} c_r = \cos(e[0]) & c_p = \cos(e[1]) & c_h = \cos(e[2]) \\ s_r = \sin(e[0]) & s_p = \sin(e[1]) & s_h = \sin(e[2]) \end{matrix}$$

according to Equation (5):

$$DCM = \begin{bmatrix} c_p * c_h & -c_r * s_h + s_r * s_p * c_h & s_r * s_h + c_r * s_p * c_h \\ c_p * s_h & c_r * c_h + s_r * s_p * s_h & -s_r * c_h + c_r * s_p * s_h \\ -s_p & s_r * c_p & c_r * c_p \end{bmatrix} \quad (5)$$

Then, the accelerometer readings can be rotated as indicated in Equation (6):

$$a_{lvl} = \text{leveled accelerometer} = \begin{bmatrix} accel_{lvlx} \\ accel_{lvly} \\ accel_{lvlz} \end{bmatrix} = DCM * e \quad (6)$$

Accordingly, initial context determinations may be performed while reduced power operation is enabled using the accelerometer information. For example, reduced power operation may be disabled when change in roll exceeds a suitable threshold, for example by tracking a suitable length of the averaged roll estimate from Equation (3) (e.g., 1 sec) and comparing it to the exemplary threshold of Equation (7):

$$\text{abs}(r_{avg}[19] - r_{avg}[0]) > 0.15 \text{ deg} \quad (7)$$

Similarly, reduced power operation may be disabled when change in pitch exceeds a suitable threshold, for example by tracking a suitable length of the averaged pitch estimate from Equation (4) (e.g., 1 sec) and comparing it to the exemplary threshold of Equation (8):

$$\text{abs}(p_{avg}[19] - p_{avg}[0]) > 0.15 \text{ deg} \quad (8)$$

As another example of context detection, accelerations in the level plane as obtained from Equation (6) can indicate an impact/motion and the direction of the impact/motion for the horizontal plane as indicated by Equations (9)-(11), which employ illustrative thresholds:

$$a_{lvlx} > \frac{0.05 \text{ m}}{s} \quad (9)$$

$$a_{lvly} > \frac{0.05 \text{ m}}{s} \quad (10)$$

$$\text{Impact}_{angle} = \text{atan}\left(\frac{a_{lvly}}{a_{lvlx}}\right) \quad (11)$$

Accelerations in the level plane as obtained from Equation (6) can also indicate whether the vehicle has been picked up, carried, moved and/or placed in another vehicle as indicated by Equation (12), which also employs an illustrative threshold:

$$\text{abs}(a_{lvlz} - \text{gravity}) > \frac{0.05 \text{ m}}{s} \quad (12)$$

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for providing a navigation solution for a vehicle comprising:
   obtaining inertial motion sensor data from a sensor assembly of the vehicle;
   detecting a static condition for the vehicle based at least in part on the inertial motion sensor data, wherein static comprises motion of the vehicle below a suitable threshold;
   selectively enabling reduced power operation based on the detected static condition, wherein enabling reduced power operation reduces processing load; and
   providing the navigation solution for the vehicle while reduced power operation is enabled.

2. The method of claim 1, wherein providing the navigation solution for the vehicle while reduced power operation is enabled comprises performing state estimation under at least one of reduced inputs and reduced computation complexity.

3. The method of claim 2, further comprising disabling at least one of a source of absolute navigational information and a sensor of the vehicle.

4. The method of claim 2, further comprising reducing a sensor sampling rate.

5. The method of claim 1, further comprising performing a hot start under normal power operation using the navigation solution provided for the vehicle while reduced power operation is enabled.

6. The method of claim 5, further comprising providing power for random access memory while reduced power operation is enabled and storing hot start parameters in the random access memory.

7. The method of claim 1, wherein selectively enabling reduced power operation is based on at least one of recency of a previous period of reduced power operation and a length of the static condition.

8. The method of claim 7, wherein selectively enabling reduced power operation is further based on a rental status of the vehicle.

9. The method of claim 1, further comprising detecting motion while reduced power operation is enabled, disabling reduced power operation and providing a subsequent navigation solution for the vehicle while reduced power operation is disabled.

10. The method of claim 1, further comprising activating wake on motion functionality while reduced power operation is enabled and disabling a host processor.

11. The method of claim 10, wherein activating the wake on motion functionality comprises selectively activating the wake on motion functionality based at least in part on recency of a previous period of wake on motion functionality activation.

12. The method of claim 1, further comprising performing context detection for the vehicle while reduced power operation is enabled.

13. The method of claim 12, further comprising disabling reduced power operation based at least in part on the context detection.

14. The method of claim 12, wherein context detection is performed using only accelerometer data.

15. A vehicle comprising a motion sensor assembly configured to provide inertial motion sensor data for deriving navigation solutions for the vehicle and a controller having at least one processor configured to:
   detect a static condition for the vehicle based at least in part on the inertial motion sensor data, wherein static comprises motion of the vehicle below a suitable threshold;
   selectively enable reduced power operation based on the detected static condition, wherein enabling reduced power operation reduces processing load; and
   provide the navigation solution for the vehicle while reduced power operation is enabled.

16. The vehicle of claim 15, wherein the controller is further configured to:
   detect motion while reduced power operation is enabled, disable reduced
   power operation; and provide a subsequent navigation solution for the
   vehicle while reduced power operation is disabled.

17. The vehicle of claim 15, wherein the controller is further configured to activate wake on motion functionality while reduced power operation is enabled and disable a host processor.

18. The vehicle of claim 15, wherein the controller is further configured to perform context detection for the vehicle while reduced power operation is enabled.

19. The vehicle of claim 18, wherein the controller is further configured to disable reduced power operation based at least in part on the context detection.

20. A sensor processor unit comprising a motion sensor assembly configured to provide inertial motion sensor data for deriving navigation solutions for a vehicle and a controller having at least one processor configured to:
   detect a static condition for the vehicle based at least in part on the inertial motion sensor data, wherein static comprises motion of the vehicle below a suitable threshold;

selectively enable reduced power operation based on the detected static condition, wherein enabling reduced power operation reduces processing load; and provide a navigation solution for the vehicle while reduced power operation is enabled.

* * * * *